March 26, 1968 I. M. GOTTLIEB 3,375,493

INDUCTIVE LOOP PRESENCE DETECTOR

Filed June 30, 1965

INVENTOR.
IRVING M. GOTTLIEB
BY
Edward A. Robinson
ATTORNEY

United States Patent Office 3,375,493
Patented Mar. 26, 1968

3,375,493

INDUCTIVE LOOP PRESENCE DETECTOR

Irving M. Gottlieb, Menlo Park, Calif., assignor to General Precision Systems Inc., a corporation of Delaware Filed June 30, 1965, Ser. No. 468,201
6 Claims. (Cl. 340—38)

Figures 1, 2:
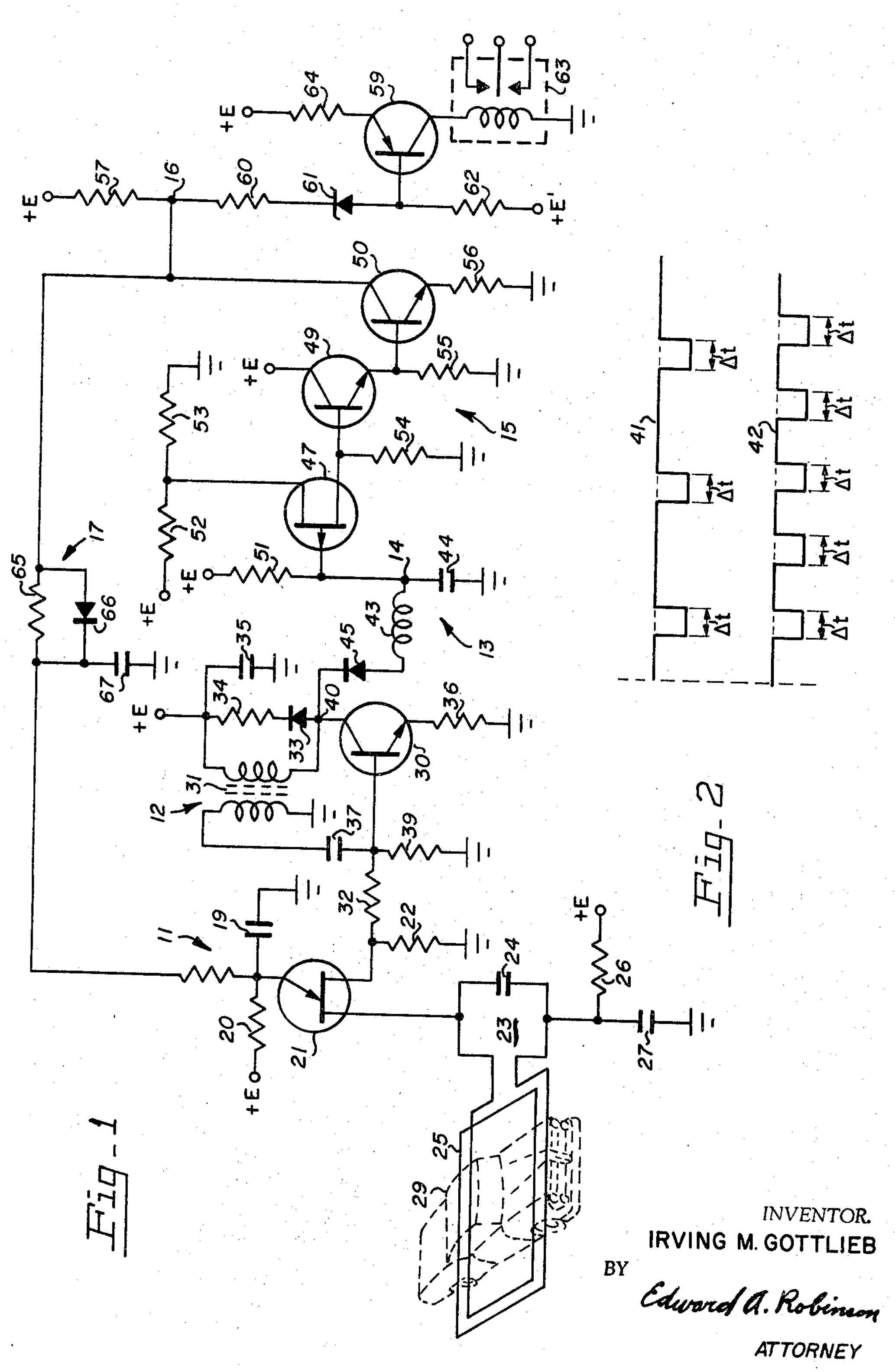

This invention relates to systems for detecting the presence of vehicles, and more particularly, to such systems wherein an inductive loop is positioned beneath the rails of a railroad track or a traffic lane of a highway or the like and wherein a variation of the inductive value of the loop is electronically sensed to detect a railroad or highway vehicle moving thereover.

A Patent No. 3,164,802 entitled, "Inductive Loop Vehicle Presence Detector," granted on Jan. 5, 1965, to Robert A. Kleist and John Scarbrough discloses several systems for detecting vehicles using inductive loops. Other inductive loop presence detector systems are shown in two co-pending patent applications of Martin John Prucha which are assigned to the same assignee as the instant application. The first of the co-pending applications is entitled, "Vehicle Presence Detector," Ser. No. 129,342 filed Aug. 4, 1961, now Patent No. 3,205,352; and the other application is entitled, "Inductive Loop Vehicle Presence Detector," Ser. No. 172,620 filed Feb. 12, 1962. In each of these presence detector systems the inductive loop is positioned beneath a path for vehicles by being embedded in the paving of a highway or the like or being laid under the rails of a railroad track. The presence of a vehicle over the loop, decreases the inductive value of the loop and a shift in the frequency of an oscillator is sensed to operate an output relay.

It is an object of this invention to provide an improved circuit for sensing the presence of a vehicle over an inductive loop, and more particularly, it is an object to provide such a system wherein a shift in the frequency of an oscillator causes a variation in the pulse repetition rate from a monostable multivibrator or the like whereby the pulses may be integrated to obtain a signal level which will vary when a vehicle moves over the loop.

It is a further object of this invention to provide an improved vehicle presence detector system wherein a shift in the frequency of a loop oscillator causes a change in a signal derived from an integrated pulse train, and the signal is passed via a feedback network to control drift of the oscillator and subsequent circuitry, and more particularly, it is an object to provide the feedback network with a double-valued time constant such that a change in the output signal of a first polarity will be passed via a long time constant circuit to correct gradual drift, while a change of the opposite polarity will be passed by a short time constant circuit for immediate correction of the oscillator.

Numerous other objects and advantages will be apparent throughout the progress of the specification which follows. The accompanying drawing illustrates a certain exemplary embodiment of the invention and the views therein are as follows:

FIGURE 1 is a circuit diagram of the presence detector system of this invention; and FIGURE 2 is a graphical representation of the waveform which may be generated and integrated to provide a direct output signal.

Briefly stated, according to a preferred embodiment of this invention, the vehicle detector system includes a loop oscillator 11 and a blocking oscillator or monostable multivibrator 12. The output signal from the monostable multivibrator comprises a train of constant duration negative pulses as shown in FIGURE 2. An integrating circuit 13 receives the train of pulses from the blocking oscillator 12 and generates a direct signal level appearing at a point 14. An amplifier 15 capable of passing direct currents provides an output signal level at a point 16 corresponding to the voltage from the integrator 13. A feedback network 17 is coupled between the output terminal 16 of the amplifier 15 and the loop oscillator 11 whereby the output voltage will bias the oscillator and correct for drift in the circuitry.

The circuit of the oscillator 13 is the subject of a co-pending patent application, Serial No. 468,451 entitled "Loop Oscillator For A Vehicle Presence Detector" filed by this inventor on an even date herewith and assigned to the same assignee as the instant application. Briefly, the oscillator 11 includes a capacitor 19 and a resistor 20 connected in series between ground reference potential and a supply voltage +E. The resistor 20 provides a charging path for the capacitor 19 such that the voltage builds up gradually at the emitter electrode of a unijunction transistor 21, until the emitter firing voltage is reached. When the emitter firing voltage is reached, the transistor 21 becomes conductive and discharges the capacitor through a low valued load resistor 22. Thus, the oscillator 11 is basically a relaxation circuit wherein the capacitor 19 repetitively charges slowly and discharges abruptly. A tuned circuit 23, including a capacitor 24 and an inductive loop 25, is coupled to the second base electrode of the unijunction transistor 21. The tuned circuit 23 is coupled to a voltage source +E by a current limiting resistor 26. A capacitor 27 provides a low impedance path for alternating currents between the tuned circuit 23 and the ground reference potential.

The tuned circuit 23 is shock excited by pulses from the unijunction transistor 21 causing currents to flow therein at a resonant frequency which is determined by the values of the capacitor 24 and the inductive loop 25. An alternating voltage will therefore appear across the tuned circuit 23 which is effectively coupled between the two base electrodes of the transistor 21 causing the transistor 21 to become conductive during times when the alternating wave of the resonant circuit 23 is of minimum values. Thus, the oscillator 11 operates as a relaxation circuit which pumps energy into the tuned circuit 23 and in turn the frequency of the relaxation circuit is controlled by the resonant frequency of the tuned circuit.

When a vehicle 29 moves into spaced relation over the loop 25, the inductive value thereof is varied thereby varying the resonant frequency of the tuned circuit 23 and likewise varying the frequency of the relaxation circuit 19–20.

The pulse generator or monostable circuit 12 includes a transistor 30 and a pulse transformer 31 which provides coupling and positive feedback between the collector electrode and the base electrode of the transistor 30. Normally, the circuit is quiescent, but when a positive signal is passed from the unijunction transistor 21 via a coupling resistor 32, the transistor is momentarily biased into conduction. A single cycle of oscillation will then occur in the pulse transformer. A diode 33 and a resistor 34 provide a path for reverse current flow through the primary winding of the transformer 31 and eliminate the possibility of a transient pulse occurring when the transistor 30 cuts off. A capacitor 35 provides filtering of the supply voltage +E. A capacitor 37 and a resistor 39 provide a time constant which together with the characteristics of the pulse transformer 31 will determine the duration times of the output pulses. A more complete description of this monostable circuit or blocking oscillator appears in a textbook entitled "Basic Oscillators" by Irving M. Gottlieb, this inventor, published by John F. Rider Publisher, Inc., in 1963 with specific reference to the material commencing on page 149.

The output from the monostable circuit or blocking oscillator 12 appearing at a point 40 comprises a train of negative pulses having constant amplitude and constant pulse duration times. The pulse rate is determined by the frequency of the oscillator 11 which triggers the blocking oscillator 12 into conduction once each cycle. FIGURE 2 shows the pulse signals which may appear at the point 40. When the oscillator signal is low in frequency, the pulses are spaced relatively far apart on a time scale as shown by the first curve 41. When the oscillator frequency increases, the pulse generator circuit 12 furnishes the same amplitude and same duration pulses at an increased repetition rate as shown by the second curve 42. The pulses of both curves will have a constant duration time, $\Delta t$, and will be of a constant amplitude being a function of the regulated voltage source +E.

The integrating circuit 13 includes an inductive winding 43 and a capacitor 44. A resistor 51 tends to charge the capacitor positively and the summation of negative pulses tend to charge the capacitor negatively. A diode 45 is provided to de-couple the integrator circuit from the pulse generating circuit at all times except when negative pulses are being passed. The integrating circuit 13 is essentially a filter which provides a direct potential level at the point 14 corresponding to the integral of the pulses or area under the curves 41–42. Obviously, the voltage appearing at the point 14 will be a function of the frequency or pulse repetition rate, since the summation of the negative pulse voltage is combined with the continuous positive voltage +E applied through the resistor 51.

The amplifier 15 includes a field-effect transistor 47, a second transistor 49 connected as an emitter follower and a third transistor amplifier 50. The source electrode of field-effect transistor 47 is coupled to a potential dividing network including two serially connected resistors 52 and 53 which are connected between the source voltage +E and ground reference potential. The drain electrode of the field-effect transistor 47 is coupled to ground potential by a load resistor 54, and is directly connected to the base electrode of the transistor 49. The transistor 49 is connected as an emitter follower with the collector electrode directly connected to the source voltage +E and the emitter electrode coupled to ground potential by a load resistor 55. The output transistor 50 has an emitter electrode coupled to ground by a resistor 56 and the collector electrode coupled to the source potential +E by a load resistor 57. The three transistors 47, 49 and 50 constitute an amplifier for amplifying the direct current level of the point 14. This amplifier is provided with a very high input impedance by the use of the field-effect transistor 47. A further advantage of this amplifier lies in the fact that the field-effect transistor 47 will have a very low temperature co-efficient to maintain the amplifier stable throughout a wide range of temperatures.

A final stage of amplification as shown in FIGURE 2 is a power transistor 59 used as a relay driver. The base electrode of the transistor 59 is coupled to the output signal appearing at the point 16 by a resistor 60 and a Zener diode 61. The base electrode is further coupled to a voltage source +E′ by a resistor 62 whereas the voltage source +E used throughout most of this system is a regulated source, the voltage source +E′ may be unregulated since it functions merely to supply power to the relay driver transistor. The Zener diode 61 functions as a "hold-off" device. Low level signals are blocked between the point 16 and the base electrode of the transistor 59. When the signal amplitude at the point 16 becomes sufficiently great, the Zener diode 61 conducts and the transistor 59 is biased into conduction. A relay 63 is directly coupled to the collector electrode of the transistor 59 such that an output switching action will result when the transistor conducts. The emitter electrode of the transistor 59 is coupled to the source voltage +E′ by a resistor 64.

The feedback network 17 comprises a resistor 65 connected in parallel with a diode 66, both elements being coupled to a capacitor 67. The resistor 65 and the capacitor 67 constitute a network having a long time constant for the feedback of currents having a generally negative polarity. On the other hand, a signal of positive polarity appearing at the output point 16 will be passed through the diode 66 which will have a low impedance and a fast time constant. Thus, the feedback correction of the network 17 is double valued—having a long time constant for output signal variations of one polarity and a short time constant for output signal variations of the other polarity.

The presence detector system of this invention may be used with a traffic counting device wherein each vehicle that enters the loop will generate an output signal resulting in a closure of the relay 63. If this presence detector is used for counting, it is desirable that signals appear only when a sudden decrease in the loop inductance, indicative of the entrance of the vehicle, will appear and that no signal will result from a sudden increase of the loop inductance indicative of the departure of a vehicle from the loop. While a sudden decrease of the loop inductance must be recognized as the entrance of a vehicle into the loop area, a slow decrease in the loop inductance may be the result of environmental changes inherent in the changes in the weather and temperature. The feedback network 17 is set up with a long time constant for a first polarity signal change such that the gradual drift effects produced by temperature and weather changes will be balanced from the system, but the more abrupt changes resulting from the entrance of a vehicle into the loop area cannot be balanced by the long time constant circuit and the apparent change in signal level at the output terminal 16 will be delayed sufficiently long for the relay 63 to operate. On the other hand, any sudden increase in the loop inductance whether or not caused by a vehicle will be balanced out by the feedback network 17 without operation of the relay 63. For example, if a vehicle were stalled or parked over the loop 25, the feedback network 17 would compensate and tune the oscillator 11 after a sufficiently long time lapse satisfying the time constant of the circuit. In this case, the vehicle detector system will become tuned with the parked vehicle over the loop. Then, if the parked vehicle moves away from the loop, the fast time constant of the network 17 will provide immediate compensation, and the system will be immediately reset to detect the next vehicle that may enter the loop area.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A system for detecting the presence of vehicles comprising an oscillator having an inductive element positioned in spaced relation with a path for vehicles, a monostable circuit coupled to the oscillator for generating constant duration pulses having a repetition rate determined by the oscillator, an integrating circuit coupled to the monostable circuit for generating a direct potential level corresponding to the repetition rate of the constant duration pulses, an output means coupled to the integrating circuit for generating an output signal responsive to the direct potential level.

2. A system for detecting the presence of vehicles comprising an oscillator having an inductive loop positioned in spaced relation with a path for vehicles, a monostable circuit coupled to the oscillator for generating pulses having constant duration times and having a repetition rate determined by the oscillator, an integrating circuit coupled to the monostable circuit for generating a direct potential level corresponding to the repetition rate of the constant duration pulses, an amplifier capable of passing direct currents coupled to the integrating circuit for generating an output signal, and a feedback path coupled between the amplifier and the oscillator for correction of drift.

3. A system for detecting the presence of vehicles comprising an oscillator having an inductive loop positioned in spaced relation with a path for vehicles, said oscillator being operable to generate a signal having a frequency which shifts when a vehicle approaches the loop, a monostable circuit coupled to the oscillator for generating pulses of constant duration and amplitude having a repetition rate determined by the frequency of the oscillator signal, an integrating circuit coupled to the monostable circuit for generating a direct signal level corresponding to the frequency of the oscillator signal and the repetition rate of the pulses, an output amplifier coupled to the integrating circuit for generating an output signal corresponding to the direct signal level, and a feedback network coupled between the output amplifier and the oscillator for minimizing the effect of drift of the oscillator, said feedback network having a long time constant for correction of signal drift of a first polarity and having a short time constant for correction of signal drift of the other polarity.

4. The system for detecting the presence of vehicles in accordance with claim 3 wherein the feedback network comprises a resistive element and a diode coupled in parallel, and a capacitor coupled between the resistive element and a point of reference potential whereby a signal of a first polarity is passed through the resistive element to charge the capacitive element with a long time constant, and whereby a signal of the other polarity is passed by the diode with a short time constant.

5. A system for detecting the presence of vehicles comprising an oscillator having an inductive loop beneath a path for vehicles, said oscillator being operable to generate a signal having a frequency which shifts when a vehicle moves over the loop, a pulse generating circuit coupled to the oscillator for generating pulses of constant amplitude and duration having a repetition rate equal to the frequency of the oscillator signal, an integrating circuit, a diode coupled between the pulse generator and the integrating circuit for passing the pulses to the integrating circuit and for isolating the integrating circuit from the pulse generator during intervals between pulses, a direct coupled amplifier having an input terminal connected to the integrating circuit and having an output terminal for passing an output signal corresponding to a direct signal level generated by the integrating circuit, and a feedback network for passing signals from the output terminal of the amplifier to bias the oscillator, said network having a relatively long time constant for passing signal variations of a first polarity and having a relatively short time constant for passing signal variations of the other polarity.

6. A system for detecting the presence of vehicles comprising an oscillator having an inductive loop beneath a path for vehicles, said oscillator being operable to generate a signal having a frequency which shifts when a vehicle moves over the loop, a pulse generating circuit coupled to the oscillator for generating pulses of constant amplitude and duration having a repetition rate equal to the frequency of the oscillator signal, an integrating circuit coupled to receive the pulses from the pulse generating circuit and operable to generate a signal level corresponding to the oscillator frequency and pulse repetition rate, a direct coupled amplifier having an input terminal connected to the integrating circuit and having an output terminal for passing an output signal corresponding to the signal level from the integrating circuit, a feedback network having a double valued time constant for passing signal variations from the output terminal of the amplifier to the oscillator with a time constant determined by the polarity of the signal variations, and an output circuit including a power transistor coupled to a relay for accomplishing switching operations in accordance with variations in the frequency of the oscillator signal, and a Zener diode coupled between the output terminal of the amplifier and the output circuit for isolating the output circuit from the amplifier when the output signal is of a low level.

References Cited

UNITED STATES PATENTS 3,266,028 8/1966 Taylor ---------------- 340—38

THOMAS B. HABECKER, *Primary Examiner.*